United States Patent [19]

Wada et al.

[11] Patent Number: 5,604,283
[45] Date of Patent: Feb. 18, 1997

[54] FLUORORUBBER COATING COMPOSITION

[75] Inventors: Nobuyoshi Wada; Toshio Mizuno; Hiroyuki Tanaka, all of Osaka, Japan

[73] Assignee: Daikin Industries, Ltd., Osaka, Japan

[21] Appl. No.: 39,230

[22] PCT Filed: Aug. 26, 1992

[86] PCT No.: PCT/JP92/01073

§ 371 Date: Apr. 20, 1993

§ 102(e) Date: Apr. 20, 1993

[87] PCT Pub. No.: WO93/04134

PCT Pub. Date: Apr. 3, 1993

[30] Foreign Application Priority Data

Aug. 27, 1991 [JP] Japan .................................. 3-215177

[51] Int. Cl.⁶ ..................................................... C08K 5/17
[52] U.S. Cl. ..................... 524/236; 524/284; 524/386; 524/387; 524/388; 524/544; 524/545; 524/546
[58] Field of Search ................................... 524/284, 236, 524/386, 387, 388, 544, 545, 546

[56] References Cited

U.S. PATENT DOCUMENTS

| 4,011,361 | 3/1977 | Vassiliou et al. | 525/178 |
| 4,243,770 | 1/1981 | Tatemoto et al. | 525/340 |
| 4,323,603 | 4/1982 | Close | 525/104 |
| 4,845,007 | 4/1989 | Hyosu et al. | 430/137 |

FOREIGN PATENT DOCUMENTS 125491  11/1978  Japan .

OTHER PUBLICATIONS

Partial Translation of Industrial Material ("Kogyo Zairyo") (1978) 26(12):46–49.

*Primary Examiner*—Peter D. Mulcahy
*Attorney, Agent, or Firm*—Birch, Stewart, Kolasch & Birch, LLP

[57] ABSTRACT

A fluororubber coating composition containing a fluororubber, a liquid medium, a coupling agent, a crosslinking agent and a carboxylic acid, which has a long pot life and provides a coating film having a uniform thickness.

16 Claims, 3 Drawing Sheets

FLUORORUBBER COATING COMPOSITION

FIELD OF THE INVENTION

The present invention relates to a fluororubber coating composition. In particular, the present invention relates to a fluororubber coating composition which has a long pot life and provides a film with a uniform thickness.

DESCRIPTION OF THE PRIOR ART

Since a conventional fluororubber coating composition suffers from gellation within 24 hours after the addition of a crosslinking agent, its pot life is short and it has some troubles in storage and application. If the composition is not gelled, crosslinking of the fluororubber will increase a viscosity of the composition, so that a coated film has an uneven thickness depending on a coating manner (See Industrial Material (KOGYO ZAIRYO), Vol. 26, No. 12 (Dec. 1978) 46–49).

SUMMARY OF THE INVENTION

One object of the present invention is to provide a fluororubber coating composition having a long pot life.

Another object of the present invention is to provide a fluororubber coating composition which provides a film having a uniform thickness when coated.

According to the present invention, there is provided a fluororubber coating composition comprising a fluororubber, a liquid medium, a coupling agent, a crosslinking agent and a carboxylic acid.

DETAILED DESCRIPTION OF THE INVENTION

Figure 1:
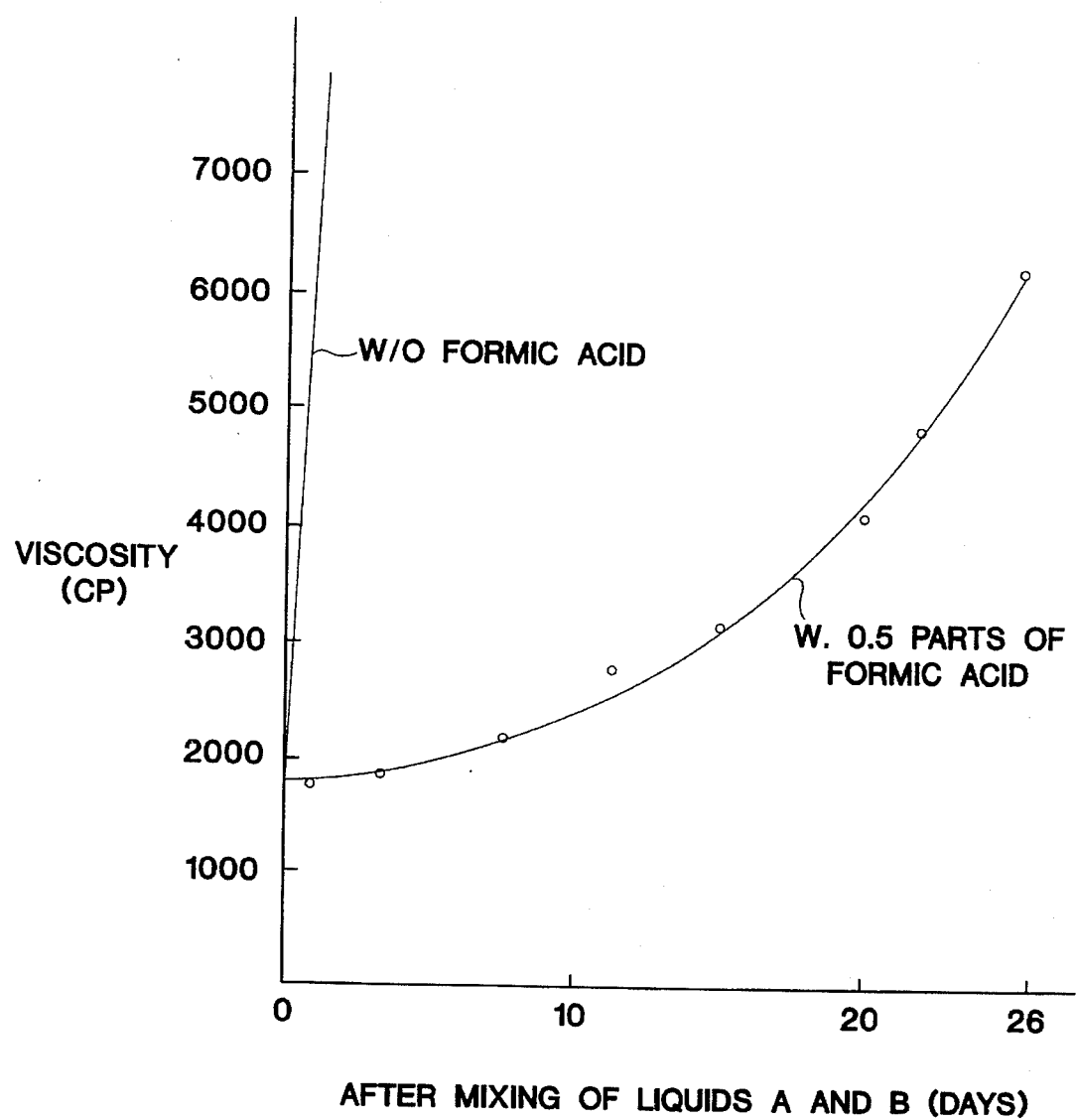
FIG. 1 is a graph showing the change of the viscosity with time of the compositions prepared in Example 1 and Comparative Example 1.

As the fluororubber contained in the coating composition of the present invention, a highly fluorinated elastomeric copolymer may be used. A preferred example of the fluororubber is an elastomeric copolymer comprising 40 to 85% of vinylidene fluoride and at least one other fluorine-containing ethylenically unsaturated monomer copolymerizable with vinylidene fluoride.

As the fluororubber, one containing iodine atoms in the polymer chain may be used. An example of the fluororubber containing iodine atoms is an elastomeric copolymer comprising 40 to 85% of vinylidene fluoride and at least one other fluorine-containing ethylenically unsaturated monomer copolymerizable with vinylidene fluoride and having 0.001 to 10% by weight, preferably 0.01 to 5% by weight of iodine atoms which are bonded to terminals of polymer chains (see Japanese Patent Kokai Publication No. 125491/1978 and U.S. Pat. No. 4,243,770).

Typical examples of the other fluorine-containing ethylenically unsaturated monomer copolymerizable with vinylidene fluoride are hexafluoropropylene, pentafluoropropylene, trifluoroethylene, trifluorochloroethylene, tetrafluoroethylene, vinyl fluoride, perfluoro(methyl vinyl ether), perfluoro(ethyl vinyl ether), perfluoro(propyl vinyl ether) and the like.

Preferred examples of the fluororubber are vinylidene fluoride/hexafluoropropylene copolymers and vinylidene fluoride/tetrafluoroethylene/hexafluoropropylene terpolymers.

Examples of other fluororubber which may be used according to the present invention are tetrafluoroethylene/propylene copolymer, ethylene/hexafluoropropylene copolymer, tetrafluoroethylene/fluorovinyl ether copolymer, vinylidene fluoride/tetrafluoroethylene/hexafluoropropylene/fluorovinyl ether copolymer, vinylidene fluoride/hexafluoropropylene copolymer and the like.

To the fluororubber coating composition, a fluororesin may be added, if desired. Examples of the fluororesin are polytetrafluoroethylene, a copolymer of tetrafluoroethylene with at least other ethylenically unsaturated monomer (e.g. olefins such as ethylene and propylene; halogenated olefins such as hexafluoropropylene, vinylidene fluoride, chlorotrifluoroethylene and vinyl fluoride; perfluoro(alkyl vinyl ether), etc.), polychlorotrifluoroethylene, polyvinylidene fluoride, and the like. Among them, polytetrafluoroethylene and a copolymer of tetrafluoroethylene with at least one monomer selected from the group consisting of hexafluoropropylene, perfluoro(methyl vinyl ether), perfluoro(ethyl vinyl ether) and perfluoro(propyl vinyl ether) in an amount of 40% by mole or less based on the amount of tetrafluoroethylene are preferred.

As the liquid medium, an organic solvent such as a ketone and an ester is used. As the ketone or ester, any one can be used insofar as the fluororubber is dissolved therein. Specific examples are acetone, methyl ethyl ketone, 2-pentanone, 3-pentanone, 2-hexanone, methyl isobutyl ketone, 2-heptanone, diisobutyl ketone, isophorone, cyclohexanone, propyl acetate, isopropyl acetate, butyl acetate, isobutyl acetate, sec.-butyl acetate, pentyl acetate, isopentyl acetate, and the like.

To the fluororubber coating composition, a liquid which can be dissolved in the liquid medium, for example, alcohols (e.g. methanol, ethanol, propanol, ethylene glycol Carbitol, cellosolve, etc.), lower ethers and DMA may be added.

The coupling agent is intended to mean a compound which acts on an interface between an organic material and an inorganic material and forms a strong bridge through a chemical or physical bond between them. Usually, the coupling agent is a compound of silicon, titanium, zirconium, hafnium, thorium, tin, aluminum or magnesium having a group which bonds the organic material and the inorganic material.

Preferred examples of the coupling agent are silane coupling agents and orthoacid esters of a transition element of the IV group in the Periodic Table or their derivatives. Among them, aminosilane compounds are preferred.

A typical example of the silane coupling agent is a silane compound of the formula:

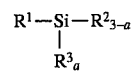

wherein $R^1$ is a $C_1$–$C_{10}$ alkyl group having at least one functional group selected from the group consisting of a chlorine atom, an amino group, an aminoalkyl group, a ureido group, a glycidoxy group, an epoxycyclohexyl group, an acryloyloxy group, a methacryloyloxy group, a mercapto group and a vinyl group, or a vinyl group; $R^2$ and $R^3$ are independently an atom or a group selected from the group consisting of a chlorine atom, a hydroxyl group, a $C_1$–$C_{10}$ alkoxyl group, a $C_2$–$C_{15}$ alkoxyl-substituted alkoxyl group, a $C_2$–$C_4$ hydroxyalkyloxy group and a $C_2$–$C_{15}$ acyloxy group; and a is 0, 1 or 2.

$R^1$ can be an alkyl group having a functional group. Preferred examples of such alkyl group are a β-aminoethyl group, a γ-aminopropyl group, a N-(β-aminoethyl)-γ-aminopropyl group, a γ-ureidopropyl group, γ-glycidoxypropyl group, a β-(3,4-epoxycyclohexyl)ethyl group, a γ-acryloyloxypropyl group, a γ-methacryloyloxypropyl group, a γ-mercaptopropyl group, a β-chloroethyl group, a γ-chloropropyl group, a γ-vinylpropyl group and the like. $R^1$ can be a vinyl group.

Preferred examples of the above silane compound are γ-aminopropyltriethoxysilane, N-β-aminoethyl-γ-aminopropyltrimethoxysilane, γ-ureidopropyltriethoxysilane, γ-glycidoxypropyltrimethoxysilane, β-(3,4-epoxycyclohexyl)ethyltrimethylsilane, γ-methacryloxypropyltrimethoxysilane, γ-mercaptopropyltrimethoxysilane, γ-chloropropyltrimethoxysilane, vinyltris(β-methoxyethoxy)silane, vinyltriethoxysilane, vinyltrichlorosilane, vinyltriacetoxysilane, N-(trimethoxysilylpropyl)ethylenediamine, N-β-aminoethyl-γ-aminopropylmethyldimethoxysilane, β-aminoethyl-β-aminoethyl-γ-aminopropyltrimethoxysilane, and the like.

Among them, the aminosilane compounds such as γ-aminopropyltriethoxysilane, N-β-aminoethyl-γ-aminopropyltrimethoxysilane, N-(trimethoxysilylpropyl)ethylenediamine, N-β-aminoethyl-γ-aminopropylmethyldimethoxysilane, γ-ureidopropyltriethoxysilane and β-aminoethyl-β-aminoethyl-γ-aminopropyltrimethoxysilane are particularly preferred, since they act as crosslinking agents of the fluororubber, greatly contribute to the increase of adhesion of the composition to a substrate and are safely used together with the liquid medium.

As the crosslinking agent, any of conventionally used ones such as amine crosslinking agents and polyol crosslinking agents may be used.

Specific examples of the amine compound are monoamines such as ethylamine, propylamine, butylamine, benzylamine, allylamine, n-amylamine and ethanolamine; diamines such as trimethylenediamine, ethylenediamine, tetramethylenediamine, hexamethylenediamine and 3,9-bis(3-aminopropyl)-2,4,8,10-tetraoxaspiro[5·5]undecane; and polyamines such as diethylenetriamine, triethylenetetramine, tetraethylenepentamine and pentaethylenehexamine. Among them, those having at least two terminal amino groups are preferred. In addition, a compound which has a functional group such as —$NH_2$, =NH, =N—, =$N^+$= or =$P^+$=, a dehydrogen fluoride ability and a crosslinking ability may be used.

As the carboxylic acid, a carboxylic acid having 1 to 8 carbon atoms is preferably used. Specific examples of the carboxylic acid are HCOOH, $CH_3COOH$, $C_2H_5COOH$, $C_7H_{13}COOH$ and the like.

Among them, formic acid is preferred since its boiling point is 101° C. so that it is evaporated off during heating for crosslinking and has no influence on the coated film.

The fluororubber coating composition of the present invention may be prepared by adding a pigment, an acid acceptor, a filler, etc. and optionally a surfactant to a mixture of the fluororubber, the liquid medium and optionally the fluororesin, then adding the coupling agent, the carboxylic acid and optionally the amine compound as well as optionally the pigment, the acid acceptor or the filler, and thoroughly mixing them. Thereby, a homogeneous fluororubber coating composition is prepared.

In general, a concentration of the fluororubber in the composition is from 10 to 50% by weight.

An amount of the coupling agent is usually from 1 to 50 parts by weight, preferably 1 to 20 parts by weight per 100 parts by weight of the fluororubber.

When the amine compound is optionally used, a total amount of the coupling agent and the amine compound is in the above range. A molar ratio of the coupling agent to the amine compound is from 99:1 to 1:99.

As the acid acceptor, any one that is conventionally used in the crosslinking of the fluororubber can be used. Examples of the acid acceptor are oxides or hydroxides of divalent metals. Specific examples are hydrotalcite, and oxides and hydroxides of magnesium, calcium, zinc and lead.

As the filler, silica, clay, diatomaceous earth. talc, carbon and the like are used.

The fluororubber coating composition of the present invention is coated on a substrate by a conventional method such as brush coating, dip coating and spray coating and then hardened at a temperature from room temperature to 400° C., preferably from 60° C. to 400° C. for a suitable time period to form a desired fluororubber coating film. If necessary, the coated film may be baked at a temperature of, for example, 100° to 300° C.

The fluororubber coating composition of the present invention can be used for surface modification of a gasket of an automobile or motorcycle engine head, various industrial gaskets, parts of copying machines, and other resin or rubber materials.

PREFERRED EMBODIMENTS OF THE INVENTION

The present invention will be illustrated more in detail by following Examples, in which "parts" are by weight.

EXAMPLE 1

Liquids A and B having the following compositions were prepared and mixed.

|  | Parts |
|---|---|
| Liquid A | |
| Fluororubber (G-501, vinylidene fluoride/ hexafluoropropylene/tetrafluoroethylene terpolymer) | 20.8 |
| Carbon black | 4.1 |
| Acid acceptor (DHT-4A, hydrotalcite sold by Kyowa Chemical Co., Ltd.) | 1.0 |
| Methyl ethyl ketone | 73.6 |
| Formic acid | 0.5 |
| Liquid B | |
| Aminosilane (silane coupling agent A-1100 manufactured by Nippon Unicar Co., Ltd.) | 1.2 |
| Diamine (Epomate F-100 manufactured by Yuka-Shell Co., Ltd.) | 0.3 |
| n-Butanol | 3.5 |

A viscosity of the misture was measured. The result is shown in FIG. 1.

COMPARATIVE EXAMPLE 1

Liquids A and B having the following compositions were prepared and mixed.

| | Parts |
|---|---|
| Liquid A | |
| Fluororubber (G-501) | 20.8 |
| Carbon black | 4.16 |
| Acid acceptor (DHT-4A) | 1.04 |
| Methyl ethyl ketone | 74 |
| Liquid B | |
| Aminosilane (silane coupling agent A-1100) | 1.2 |
| Diamine (Epomate F-100) | 0.3 |
| n-Butanol | 3.5 |

A viscosity of the mixture was measured. The result is shown in FIG. 1.

EXAMPLE 2

Figure 2:
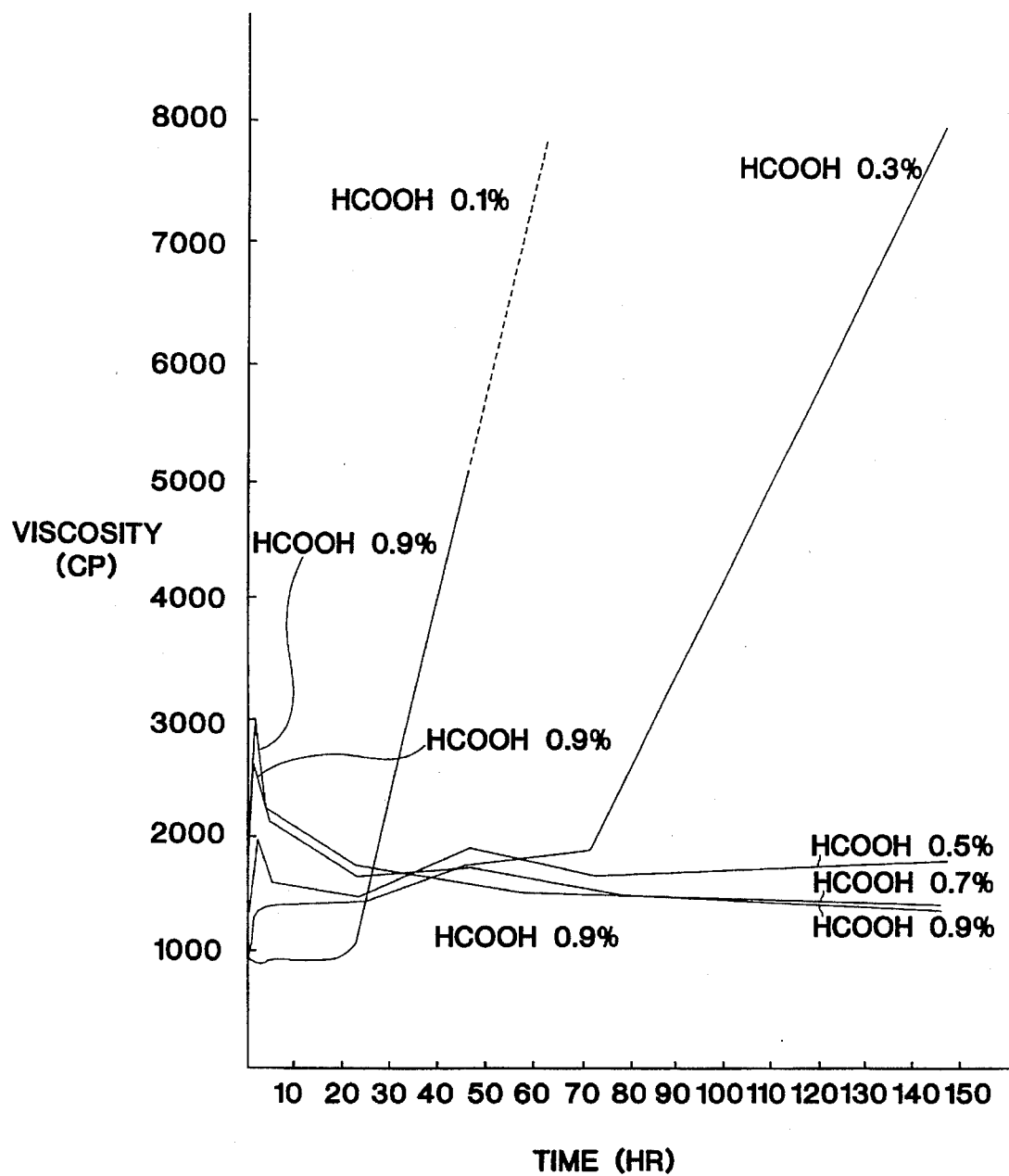
FIG. 2 is a graph showing the change of the viscosity with time of the composition prepared in Example 2 containing various concentrations of formic acid.

Liquid A consisting of the fluororubber (G-501) (20.8 parts), carbon black (4.16 parts), the acid acceptor (DHT-4A) (1.04 parts), methyl isobutyl ketone (74 parts) and formic acid (0.1, 0.3, 0.5, 0.7 or 0.9 part) was prepared and mixed with the same Liquid B as used in Example 1. Then, a viscosity of the mixture was measured. The results are shown in FIG. 2.

EXAMPLE 3

Figure 3:
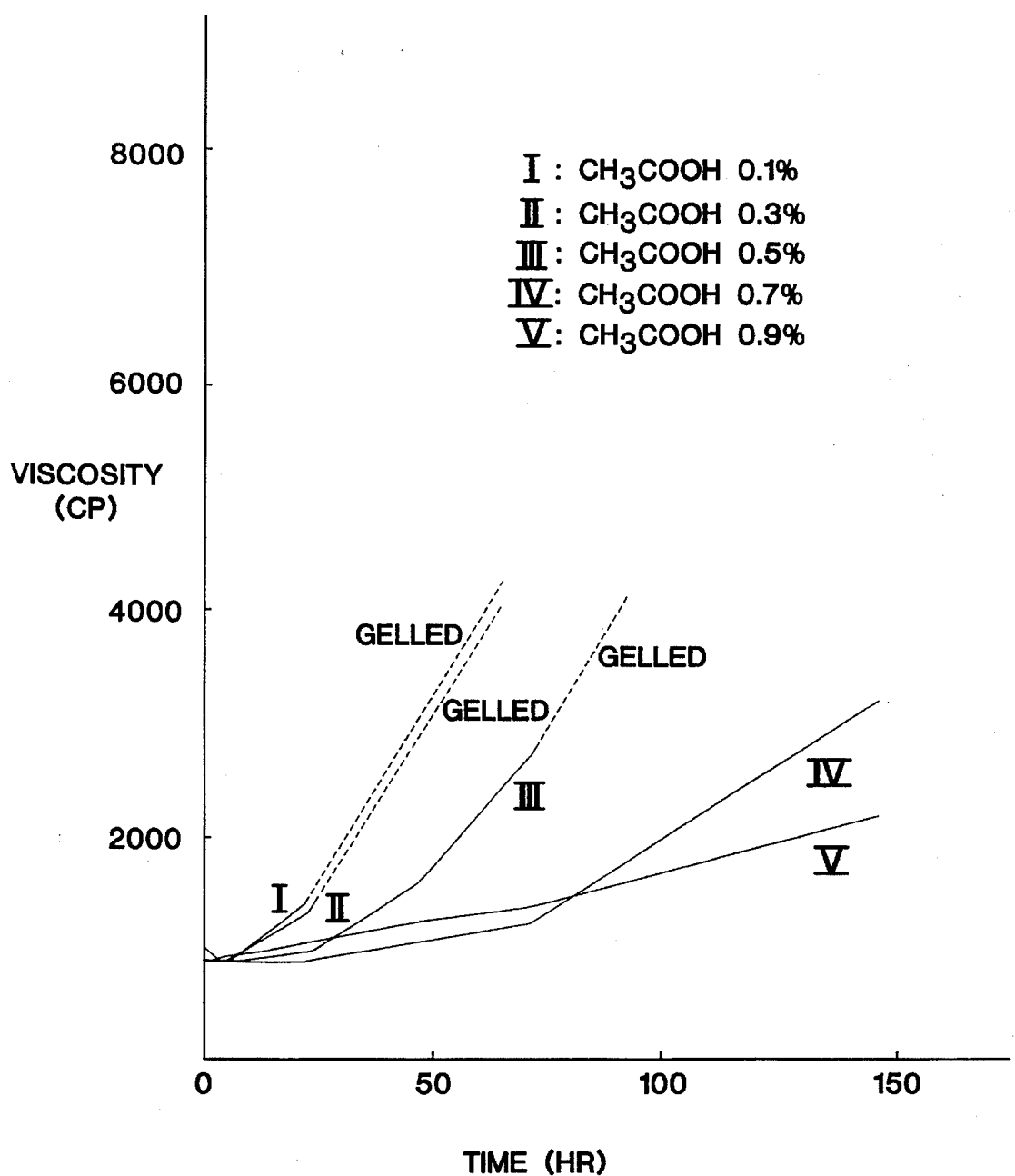
FIG. 3 is a graph showing the change of the viscosity with time of the composition prepared in Example 3 containing various concentrations of acetic acid.

In the same manner as in Example 2 but using acetic acid in place of formic acid, a mixture was prepared and its viscosity was measured. The results are shown in FIG. 3.

What is claimed is:

1. A fluororubber coating composition comprising a fluororubber, a liquid medium, a coupling agent, an amine crosslinking agent or a polyol crosslinking agent, and at least 0.5 parts by weight of a carboxylic acid having 1 to 8 carbon atoms.

2. The fluororubber coating composition according to claim 1, wherein said fluororubber is an elastomeric copolymer comprising 40 to 85% of vinylidene fluoride and at least one other fluorine-containing ethylenically unsaturated monomer copolymerizable with vinylidene fluoride.

3. The fluororubber coating composition according to claim 2, wherein said other fluorine-containing ethylenically unsaturated monomer copolymerizable with vinylidene fluoride is at least one monomer selected from the group consisting of hexafluoropropylene, pentafluoropropylene, trifluoroethylene, trifluorochloroethylene, tetrafluoroethylene, vinyl fluoride, perfluoro(methyl vinyl ether), perfluoro(ethyl vinyl ether) and perfluoro(propyl vinyl ether).

4. The fluororubber coating composition according to claim 2, wherein said fluororubber is a fluororubber selected from the group consisting of vinylidene fluoride/hexafluoropropylene copolymers and vinylidene fluoride/tetrafluoroethylene/hexafluoropropylene terpolymers.

5. The fluororubber coating composition according to claim 1, wherein said coupling agent is a silane coupling agent.

6. The fluororubber coating composition according to claim 5, wherein said silane coupling agent is a silane compound of the formula:

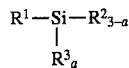

wherein $R^1$ is a $C_1-C_{10}$ alkyl group having at least one functional group selected from the group consisting of a chlorine atom, an amino group, an aminoalkyl group, a ureido group, a glycidoxy group, an epoxycyclohexyl group, an acryloyloxy group, a methacryloyloxy group, a mercapto group and a vinyl group, or a vinyl group; $R^2$ and $R^3$ are independently an atom or a group selected from the group consisting of a chlorine atom, a hydroxyl group, a $C_1-C_{10}$ alkoxyl group, a $C_2-C_{15}$ alkoxyl-substituted alkoxyl group, a $C_2-C_4$ hydroxyalkyloxy group and a $C_2-C_{15}$ acyloxy group; and a is 0, 1 or 2.

7. The fluororubber coating composition according to claim 1, wherein said carboxylic acid is at least one selected from the group consisting of $HCOOH$, $CH_3COOH$, $C_2H_5COOH$ and $C_7H_{13}COOH$.

8. The fluororubber coating composition according to claim 7, wherein said carboxylic acid is formic acid.

9. The fluororubber coating composition according to claim 1, wherein a concentration of said fluororubber is from 10 to 50% by weight based on the weight of the whole composition.

10. The fluororubber coating composition according to claim 1, wherein an amount of said coupling agent is from 1 to 50 parts by weight per 100 parts by weight of said fluororubber.

11. The fluororubber coating composition according to claim 1, wherein said fluororubber is an elastomeric copolymer comprising 40 to 85% of vinylidene fluoride, at least one other fluorine-containing ethylenically unsaturated monomer, and 0.001 to 10% by weight of iodine atoms.

12. The fluororubber coating composition according to claim 11, wherein the content of said iodine atoms in said elastomeric copolymer is 0.01 to 5% by weight.

13. The fluororubber coating composition according to claim 1, further comprising a fluororesin.

14. The fluororubber coating composition according to claim 1, wherein said coupling agent is selected from the group of γ-aminopropyltriethoxysilane, N-β-aminoethyl-γ-aminopropyltrimethoxysilane, γ-ureidopropyltriethoxysilane, γ-glycidoxypropyltrimethoxysilane, β-(3,4-epoxycyclohexyl)ethyltrimethylsilane, γ-methacryloxypropyltrimethoxysilane, γ-mercaptopropyltrimethoxysilane, γ-chloropropyltrimethoxysilane, vinyltris(β-methoxyethoxy)silane, vinyltriethoxysilane, vinyltrichlorosilane, vinyltriacetoxysilane, N-(trimethoxysilylpropyl)ethylenediamine, N-β-aminoethyl-γ-aminopropylmethyldimethoxysilane, and β-aminoethyl-β-aminoethyl-γ-aminopropyltrimethoxysilane.

15. A fluororubber coating composition comprising a fluororubber comprising 40 to 85% of vinylidene fluoride and at least one other fluorine-containing ethylenically unsaturated monomer copolymerizable with vinylidene fluoride, a liquid medium, a coupling agent, an amine cross-linking agent or a polyol cross-linking agent and at least 0.5 parts by weight of a carboxylic acid having 1 to 8 carbon atoms.

16. A fluororubber coating composition consisting essentially of a fluororubber comprising 40 to 85% of vinylidene fluoride and at least one other fluorine-containing ethylenically unsaturated monomer copolymerizable with vinylidene fluoride, a liquid medium, a coupling agent, an amine cross-linking agent or a polyol cross-linking agent and having at least 0.5 parts by weight of a carboxylic acid having 1 to 8 carbon atoms.

\* \* \* \* \*